United States Patent
Kim et al.

(10) Patent No.: US 12,474,357 B2
(45) Date of Patent: Nov. 18, 2025

(54) SPECIMEN COLLECTION ROBOT SYSTEM FOR NON FACE-TO-FACE SAMPLING

(71) Applicant: KOREA INSTITUTE OF SCIENCE AND TECHNOLOGY, Seoul (KR)

(72) Inventors: Keri Kim, Seoul (KR); Jeongryul Kim, Seoul (KR); Sang Kyung Kim, Seoul (KR); Suhun Jung, Seoul (KR); Yonghwan Moon, Seoul (KR); Buchun Song, Seoul (KR); Hong Jun Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 771 days.

(21) Appl. No.: 17/846,623

(22) Filed: Jun. 22, 2022

(65) Prior Publication Data

US 2023/0358774 A1  Nov. 9, 2023

(30) Foreign Application Priority Data

May 4, 2022   (KR) ........................ 10-2022-0055142

(51) Int. Cl.
| | |
|---|---|
| A61B 10/00 | (2006.01) |
| A61B 5/08 | (2006.01) |
| A61B 10/02 | (2006.01) |
| A61B 34/30 | (2016.01) |
| A61B 34/37 | (2016.01) |
| A61G 10/00 | (2006.01) |
| A61L 2/10 | (2006.01) |
| B25J 9/06 | (2006.01) |
| B25J 15/00 | (2006.01) |

(Continued)

(52) U.S. Cl.
CPC ........... *G01N 35/0099* (2013.01); *G01N 1/02* (2013.01); *G01N 2001/028* (2013.01)

(58) Field of Classification Search
None
See application file for complete search history.

(56) References Cited

U.S. PATENT DOCUMENTS

2018/0281204 A1* 10/2018 Fromm ................. B25J 15/106
2021/0369252 A1* 12/2021 Sun ......................... A61B 34/32

FOREIGN PATENT DOCUMENTS

CN        112089447 A  * 12/2020 ......... A61B 10/0051
KR   10-2021-0136385 A    11/2021
(Continued)

OTHER PUBLICATIONS

YouTube channel: Iris Calculator, Video: Mechanical Iris Assembly in SolidWorks, Posted: Jan. 23, 2019, https://www.youtube.com/watch?v=bUVjFGmpQXw (Year: 2019).*

(Continued)

*Primary Examiner* — Maris R Kessel
*Assistant Examiner* — Madison Taylor Herbert
(74) *Attorney, Agent, or Firm* — NSIP Law

(57) ABSTRACT

A specimen collection robot system for performing a specimen collection process having performing specimen collection of a subject with a swab and inserting the swab into a reagent tube has a robot including a gripper and a robot arm. The gripper is configured to grip objects with different diameters by using a same gripping portion. The robot is configured to perform the specimen collection process, by selectively gripping the swab and the reagent tube, without replacing the gripper.

12 Claims, 15 Drawing Sheets

(51) Int. Cl.
    *B25J 15/02*          (2006.01)
    *B25J 19/02*          (2006.01)
    *G01N 1/02*           (2006.01)
    *G01N 35/00*         (2006.01)

(56) References Cited

FOREIGN PATENT DOCUMENTS

| | | | | |
|---|---|---|---|---|
| KR | 10-2022-0025977 A | 3/2022 | | |
| KR | 10-2394884 B1 | 5/2022 | | |
| WO | WO-2021168530 A1 * | 9/2021 | .............. | B01L 3/502 |
| WO | WO 2021/215702 A1 | 10/2021 | | |
| WO | WO-2022025445 A1 * | 2/2022 | ......... | A61B 10/0051 |

OTHER PUBLICATIONS

YouTube channel: Iris Calculator, Video: Prototype Clamping Iris (2018), Posted: Apr. 6, 2021, https://www.youtube.com/watch?v=iT9aLvsITLo (Year: 2021).*

* cited by examiner

SPECIMEN COLLECTION ROBOT SYSTEM FOR NON FACE-TO-FACE SAMPLING

CROSS-REFERENCE TO RELATED APPLICATION

This application claims priority to Korean Patent Application No. 10-2022-0055142, filed on May 4, 2022, and all the benefits accruing therefrom under 35 U.S.C. § 119, the contents of which in its entirety are herein incorporated by reference.

BACKGROUND

1. Field

The present disclosure relates to a specimen collection robot system, and more particularly, to a robot system capable of automatically performing or assisting a viral or bacterial specimen collection process in a non-face-to-face environment.

DESCRIPTION OF GOVERNMENT-FUNDED RESEARCH AND DEVELOPMENT

This research is conducted by Korea Institute of Science and Technology, and funded by Convergence Research Group project of National Research Council of Science & Technology, Ministry of Science and ICT, Republic of Korea (Development of system for non-face-to-face and rapid screening treatment, No. 1711151313).

2. Description of the Related Art

In order to determine a respiratory disease caused by bacterial or viral infection, a specimen collection method of collecting a specimen by inserting a swab into a nasal cavity or oral cavity of a subject is used.

The specimen collection method is directly performed by a medical staff member. In general, the specimen collection method is performed in such a manner that the medical staff member holds the swab with one hand, collects a specimen from the nasal cavity of the subject, breaks the swab into a tube containing a reagent (reagent tube) held in the other hand, closes a lid of the reagent tube, and places the reagent tube at a certain mounting position.

As such, when the medical staff member directly performs specimen collection in a face-to-face manner, secondary infection in which the medical staff member is infected during a specimen collection process may occur. Also, when a large number of subjects need to be tested such as in a pandemic situation, fatigue of medical staff accumulates.

As these problems are recognized, some non-face-to-face specimen collection robot systems using robots have been proposed.

In a specimen collection robot system according to the related art, specimen collection is performed by holding a swab, by using a robot arm (specimen robot arm) of a so-called '$R_y R_h R_h$ method' which is mounted on the ground and operates by using the rotation of joints. In addition, the robot system separately includes a robot arm (reagent tube transfer robot arm) mounted on the ground and operating by using the rotation of joints, to transfer a reagent tube.

In the related art, because both the specimen robot arm and the reagent tube transfer robot arm are placed on the ground and horizontally rotate, a very large work space is required to configure the specimen collection robot system.

That is, in the robot system according to the related art, because a specimen collection process is performed by using two robot arms, a space required to install the two robot arms and secure a work area to avoid interference between the two robot arms is very large.

Also, in the robot system, because it is essential to use two robot arms in a specimen collection process, the structure and control of the robot system are complicated, and required costs are increased. Also, there is a limitation in identifying an accurate specimen path.

SUMMARY

The present disclosure is directed to providing a specimen collection robot system in which space utilization is maximized by using a single robot arm.

In one aspect, there is provided a specimen collection robot system for performing a specimen collection process including performing specimen collection of a subject with a swab and inserting the swab into a reagent tube, the specimen collection robot system including a robot including a gripper and a robot arm, wherein the gripper is configured to grip objects with different diameters by using a same gripping portion, wherein the robot is configured to perform the specimen collection process, by selectively gripping the swab and the reagent tube, without replacing the gripper.

The gripper may include a first drum including a hollow, a second drum including a hollow and connected to the first drum, and a plurality of bands fixed to span the first drum and the second drum, in the hollows of the drum and the second drum, wherein the first drum and the second drum are relatively rotatable, wherein, due to the relative rotation of the first drum and the second drum, the plurality of bands are twisted with one another, to tighten and fix an object entering the hollows.

The gripper may include a third drum connected to the second drum on a side opposite to the first drum, and the plurality of bands fixed to span the second drum and the third drum, in the hollows of the second drum and the third drum, wherein the second drum and the third drum are relatively rotatable, wherein the first drum and the second drum relatively rotate and the second drum and the third drum relatively drum relatively rotate, to form a two-stage band twisted structure around the second drum.

Each of the plurality of bands may be formed to span the first drum, the second drum, and the third drum, wherein the second drum rotates with respect to the first drum and the third drum that are fixed.

An end portion of the third drum may be closed, wherein a sensor for detecting a contact of an object entering the hollow is formed at the closed end portion of the third drum, wherein when the contact of the object is detected by the sensor, the first drum and the second drum relatively rotate, and the second drum and the third drum relatively rotate.

A relative rotation angle of the first drum and the second drum and a relative rotation angle of the second drum and the third drum may be pre-determined according to diameters of the swab and the reagent tube.

Each of the plurality of bands may have a width greater than a thickness and is formed of an elastic material.

The robot may include an end effector mounted on the robot arm and configured to change a posture and a position of the gripper.

The end effector may include a posture changing module configured to adjust an orientation angle of the gripper, a rotation module configured to rotate the gripper, an insertion module configured to move the gripper in a front-back direction, and a translation module configured to move the gripper in a front-back-left-right direction in a plane perpendicular to the front-back direction.

The posture changing module may be connected to the gripper, the rotation module may be connected to the posture changing module to rotate the posture changing module, the insertion module may be connected to the rotation module to move the rotation module in the front-back direction, and the translation module may be connected to the insertion module to move the insertion module in the front-back-left-right direction in the plane perpendicular to the front-back direction.

The robot arm may include a first link pivotable with respect to a base, and a second link pivotable with respect to the first link and allowing the end effector to be mounted thereon.

The specimen collection robot system may include a test booth in which the robot is installed, wherein the test booth comprises a rack, and a beam located over the rack and extending in a first direction, wherein the robot arm comprises a base linearly moving along the beam, and a plurality of links connected in series to the base.

A swab mount holder, an input tube mount holder, a tube processing device and an output tube mount holder may be arranged on the rack, wherein the swab mount holder is configured to hold the swab, the input tube mount holder is configured to hold the reagent tube, the tube processing device is configured to open a lid of the reagent tube, and the output tube mount holder is configured to hold the reagent tube into which the swab used for specimen collection is inserted, wherein, during the specimen collection process, the robot arm operates so that the gripper sequentially passes through the input tube mount holder, the tube processing device, the swab mount holder, the subject, the tube processing device, and the output tube mount holder.

The swab mount holder, the input tube mount holder, and the output tube mount holder may be located behind the beam in a second direction perpendicular to the first direction, and the tube processing device may be located in front of the beam in the second direction, wherein, during the specimen collection process, the robot arm swings around the beam.

A disinfection device for ultraviolet disinfecting the gripped swab on the swab mount holder may be further arranged on the rack, wherein a body of the gripper has a shape and a size enough to block an inlet portion of the disinfection device.

DETAILED DESCRIPTION

Figure 1:
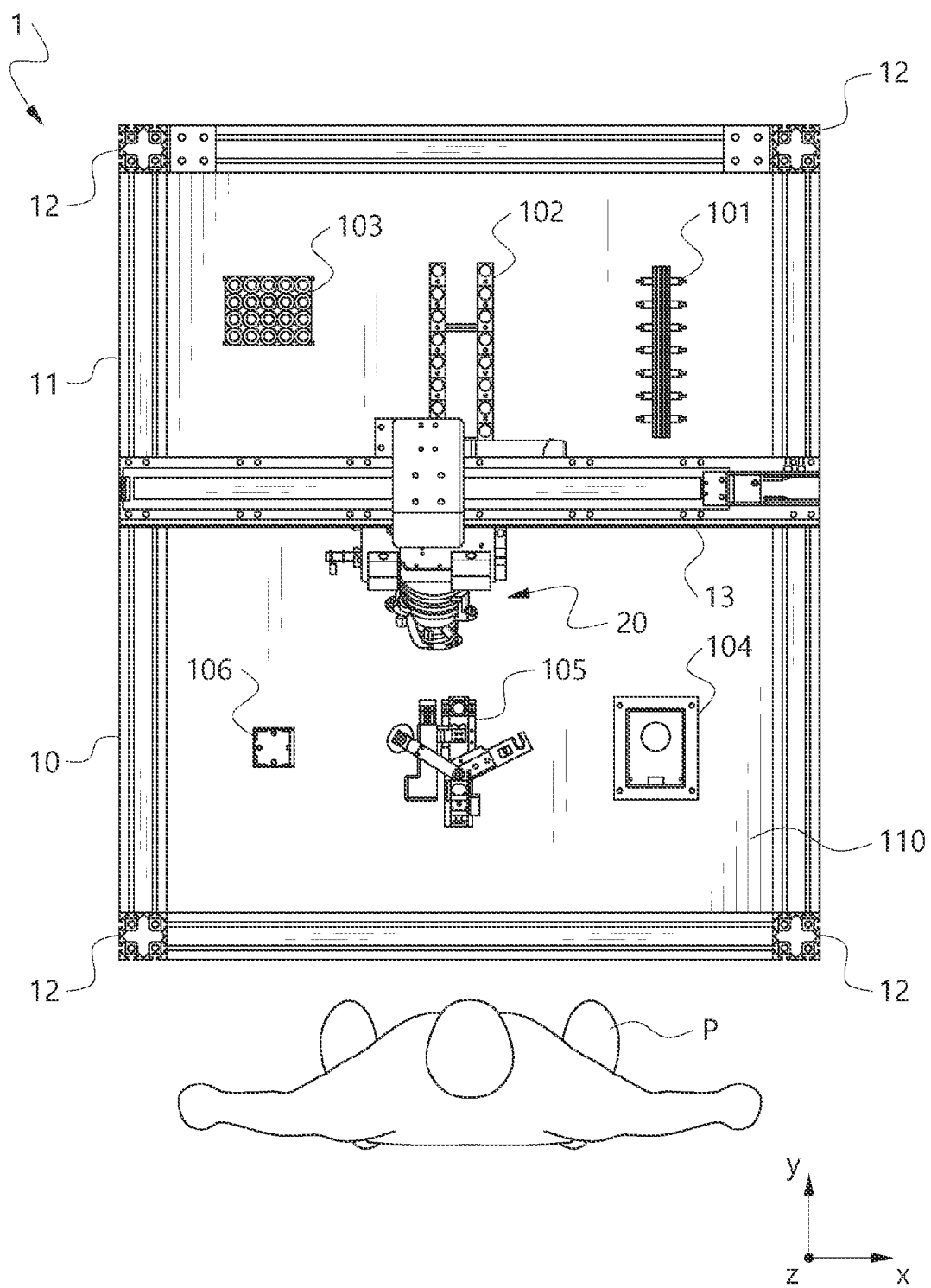
FIG. 1 is a plan view illustrating a robot system according to an embodiment.

Hereinafter, preferred embodiments of the present disclosure will be described with reference to the attached drawings. Although the embodiments illustrated in the drawings are described, these are merely examples, and the technical spirit and scope, essential elements, and operation of the present disclosure are not limited thereto.

FIG. 1 is a schematic view illustrating a specimen collection robot system (hereinafter, simply referred to as 'robot system') 1 according to an embodiment.

The robot system 1 according to the present embodiment performs a specimen collection process. In the specification, the 'specimen collection process' refers to a series of processes of performing specimen collection of a subject by holding a swab and a reagent tube that are located at initial positions and are not used yet and moving the swab and the reagent tube to set test positions, inserting the swab (entirely or partially) into the reagent tube, and moving the reagent tube into which the swab is inserted to a final position. A process of setting the swab and the reagent tube at the initial positions and transferring or taking out the reagent tube from the final position to a disease identification test site is not included in the 'specimen collection process'. The initial positions and the final position are not limited to positions inside a test booth, and may be any positions inside/outside the test booth.

Referring to FIG. 1, the robot system 1 according to the present embodiment includes one robot 20, and a test booth 10 in which the robot 20 is installed.

The test booth 10 includes a rack 14 (see FIG. 2) formed to a certain height from the bottom, a pillar frame 12 upright from each of four corners of the rack 14, and an upper frame 11 having a quadrangular shape and provided on upper ends of the pillar frames 12.

Also, the test booth 10 includes a beam 13 spaced apart by a certain distance from a top surface of the rack 14, and extending in an X-axis direction (first direction) in FIG. 1.

The beam 13 may be laid across two facing frames of the upper frame 11 extending in a Y-axis direction from the upper frame 11. Alternatively, auxiliary frames extending in the Y-axis direction may be provided at a height lower than that of the two facing frames extending in the Y-axis direction, and the beam 13 may be laid across the auxiliary frames.

In the specification, although the X-axis direction (first direction), the Y-axis direction (second direction), and a Z-axis direction (third direction) are perpendicular to one another to define a space, the X-axis direction, the Y-axis direction, and the Z-axis direction refer to relative directions perpendicular to one another and do not refer to directions defining an absolute coordinate system.

In the specification, to maximize space utilization and perform a rapid operation, the Y-axis direction (second direction) is a direction in which a subject P views the robot system 1.

According to the present embodiment, the robot 20 is installed on the beam 13 of the test booth 10, and is suspended above the rack 14.

Figure 2:
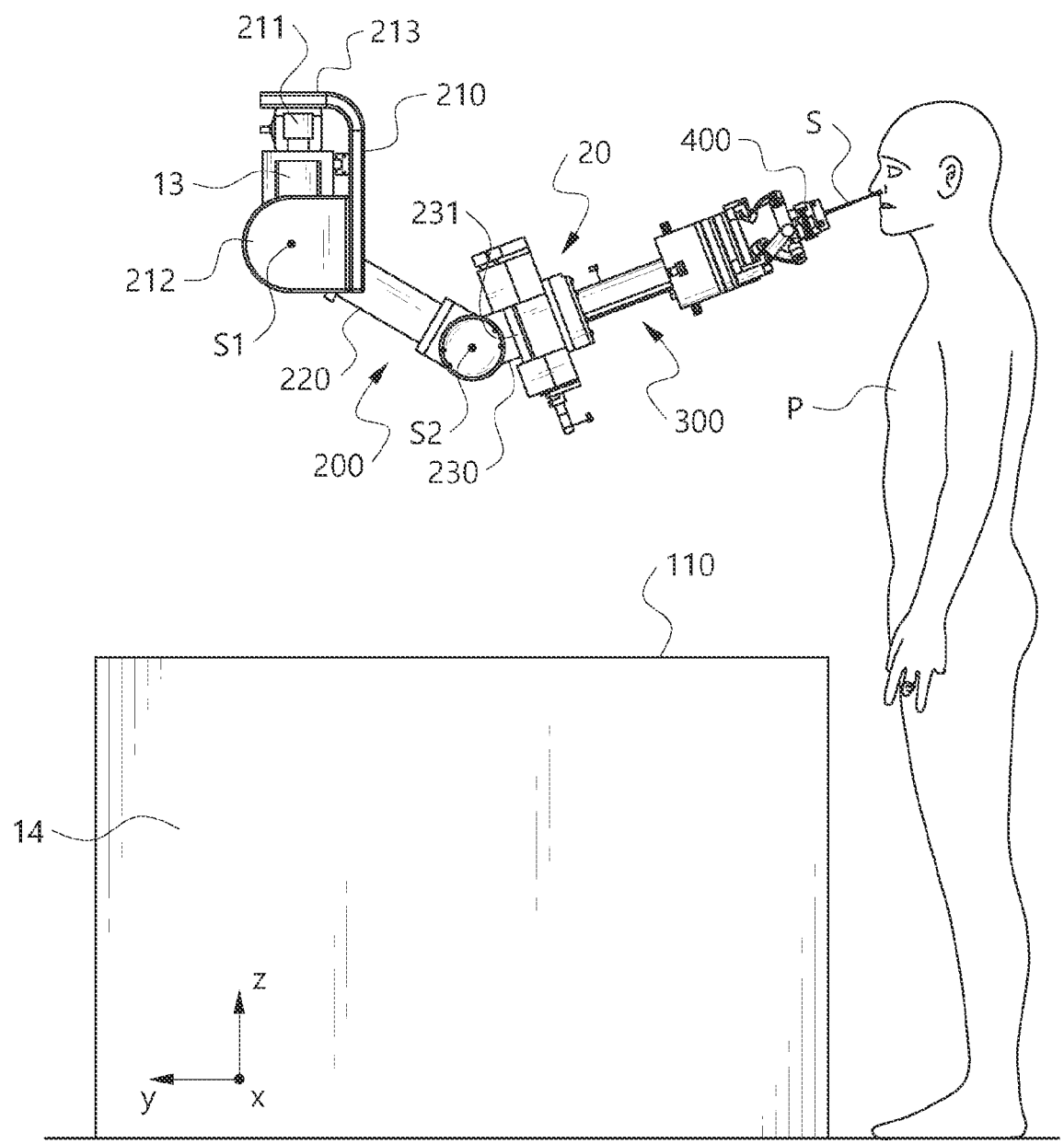
FIG. 2 is a side view illustrating the robot system of FIG. 1.

FIG. 2 is a view illustrating a state where the robot 20 is installed according to an embodiment. In FIG. 2, for convenience of illustration, all frames of the test frame 10 except for the beam 13 are not shown.

As shown in FIG. 2, the robot 20 includes a robot arm 200 installed on the beam 13, an end effector 300 provided on an end portion of the robot arm 200, and a gripper 400 provided on the end effector 300.

The end effector 300 is mounted on the end portion of the robot arm 200, and is configured to change a posture and a position of the gripper 400. The gripper 400 may selectively grip a swab S and a reagent tube U.

The end effector 300 and the gripper 400 will be described below in more detail, and the robot arm 200 will be described first.

Referring to FIG. 2, the robot arm 200 includes a base 210 mounted on the beam 13, and a plurality of links, e.g., first and second links 220, 230, connected in series to the base 210. In the present embodiment, the first link 220 is pivotably connected to the base 210, and the second link 230 is pivotably connected to the first link 220.

The base 210 is mounted on the beam 13, and is linearly movable in the X-axis direction along the beam 13. The base 210 includes a moving portion 211 located over the beam 13 and placed on the beam 13, a base end portion 212 located under the beam 13 and pivotably fixing the first link 220, and a connecting portion 213 connecting and fixing the moving portion 211 to the base end portion 212.

The moving portion is driven by a driving device (not shown) to slide along the beam 13 in an extending direction of the beam 13. Accordingly, the entire base 210 (i.e., the robot arm 200) is linearly movable along the beam 13.

An end portion of the first link 220 is connected to the base end portion 212. The first link 220 is pivotably connected to the base end portion 212 about a first axis S1. A driving device (e.g., a servo motor (not shown)) for pivoting the first link 220 is connected to the base end portion 212.

An end portion of the second link 230 is connected to the other end portion of the first link 220. The second link 230 is pivotably connected to the first link 220 about a second axis S2. A driving device (e.g., a servo motor (not shown)) for pivoting the second link 230 with respect to the first link 220 is connected to a connection portion between the first link 220 and the second link 230. In the present embodiment, the first axis S1 and the second axis S2 are parallel to each other.

A connector 231 to which the end effector 300 may be connected is formed on the other end portion of the second link 230, and an end portion of the end effector 300 is connected and fixed to the connector 231. According to the present embodiment, the end effector 300 does not move relative to the second link 230, and a posture and a position of the end effector 300 are changed according to a movement of the second link 230.

The robot arm 200 according to the present embodiment has a manipulator structure using a so-called '$R_y R_h T_h$ method' with one translation (linear movement) and two rotations. Because the robot arm using the '$R_y R_h T_h$ method' has less required length compensation compared to a working radius, when compared to a robot arm using a '$R_y R_h R_h$ method' of the related art, a size of the test booth 10 may be reduced and a length of a link of the robot arm may be shortened. In addition, changes in a work may be designed in more various ways.

Figure 3A:
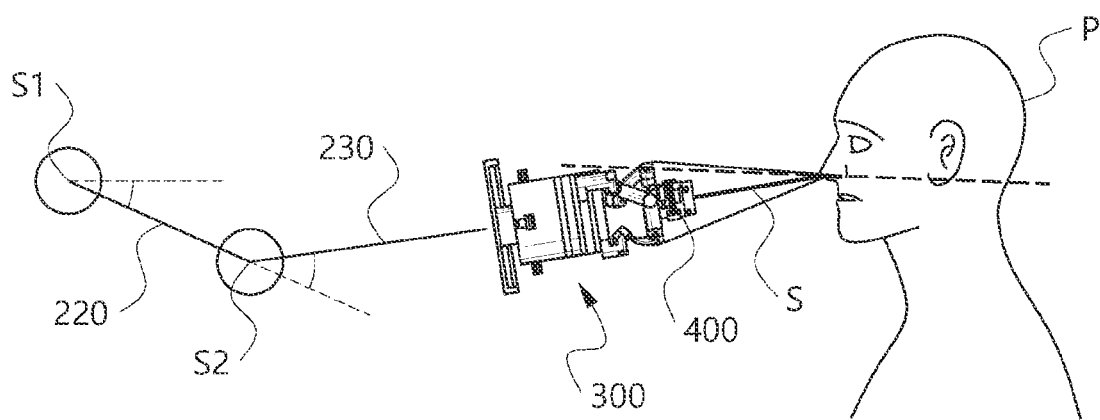
FIGS. 3A and 3B are schematic views for describing an example of setting sizes of elements of the robot system of FIG. 1.
Figure 3B:
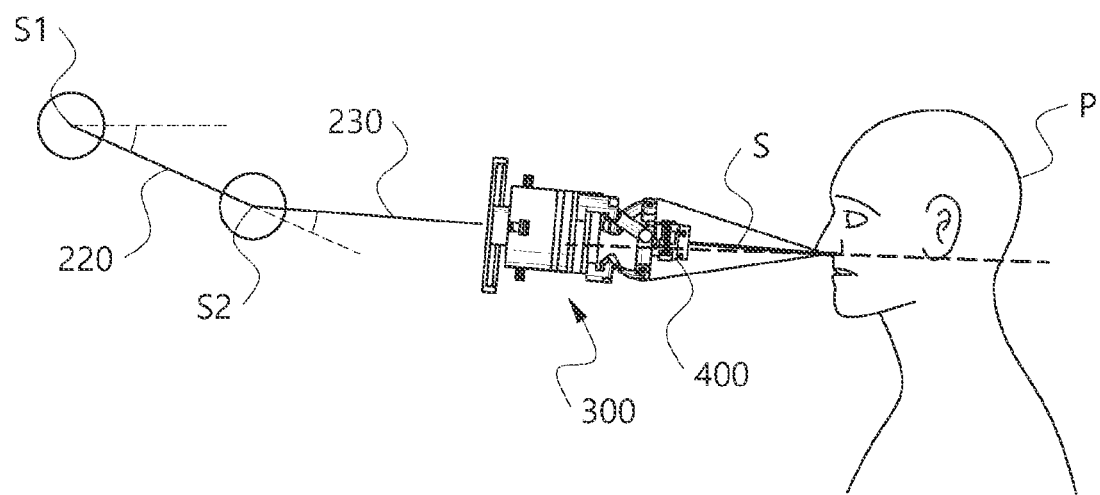

FIGS. 3A and 3B are schematic views for describing an example of selecting a length of a link for the robot arm 200 and a size of the test booth 10. In FIGS. 3A and 3B, a configuration of the robot arm 200 is schematically illustrated.

FIG. 3A illustrates a case where a height of the subject P is a maximum height (about 190 cm). FIG. 3B illustrates a case where a height of the subject P is a minimum height (about 150 cm). In the present embodiment, the subject P is tested in a standing position.

Lengths of the first link 220 and the second link 230 are respectively $I_1$ and $I_2$. In FIG. 3A (maximum height), a joint angle between the first link 220 and a horizontal plane is $\theta_{11}$, and an angle between the first link 220 and the second link 230 is $\theta_{12}$. In FIG. 3B (minimum height), a joint angle between the first link 220 and a horizontal plane is $\theta_{21}$, and an angle between the first link 220 and the second link 230 is $\theta_{22}$.

Under this geometry, for $I_1$, $I_2$, $\theta_{11}$, and $\theta_{21}$ satisfying the following equations (1) through (4), a nonlinear simultaneous equation was solved by adjusting a height of an environment variable H (linear actuator of base) and D (distance to collection position) through Matlab.

$$l_1 \sin \theta_{11} + l_2 \sin 10° + H = 1738 - 446 \sin 10° \quad (1)$$

$$l_1 \cos \theta_{11} + l_2 \cos 10° + D - 446 \cos 10° \quad (2)$$

$$l_1 \sin \theta_{21} + l_2 \sin(-5°) + H = 1372 - 446 \sin(-5°) \quad (3)$$

$$l_1 \cos \theta_{21} + l_2 \cos(-5°) = D - 446 \cos(-5°) \quad (4)$$

From among extracted data, $I_1$=320 mm and $I_2$=80 mm to minimize a size of the test booth 10, and when working radii of the robot arm 200 and the end effector 300 are considered, a size [mm] of the test booth 10 may be determined to be 1200×1460×1980.

That is, when a structure of the robot arm 200 according to the present embodiment is used, because a specimen collection process may be performed by using the test booth 10 with a width of 1200 mm, the robot system 1 may be configured even in a very small space.

Also, the robot 20 that may cover all average height ranges of subjects by using a link with a relatively short length may be configured.

Also, according to the present embodiment, because a structure of the robot arm 200 suspended at an upper position in the test booth 10 is used, the subject P may undergo specimen collection in a standing position while moving, without having to sit on a chair or the like, and thus, an optimized test path may be set.

In addition, when a structure of the robot arm 200 is used, a space may be reduced and space utilization may be optimized.

Referring back to FIGS. 1 and 2, because the robot arm 200 is suspended at an upper position by the beam 13, an installation space for the robot 20 is not required on a work surface 110 that is a top surface of the rack 14. Accordingly, various devices or equipment required for a specimen collection process may be compactly and efficiently arranged on the work surface 110 of the rack 14.

As shown in FIG. 1, on the work surface 110 of the rack 14, a swab mount holder 101 on which the swab S to be used for specimen collection is mounted, an input tube mount holder 102 on which the reagent tube U to be used for test is mounted, and an output tube mount holder 103 on which the reagent tube U into which the swab S used for specimen collection is inserted is mounted are arranged. The swab mount holder 101, the input tube mount holder 102, and the output tube mount holder 103 are located behind the robot 20 with respect to the beam 13.

According to the present embodiment, the swab mount holder 101, the input tube mount holder 102, and the output tube mount holder 103 are simple mount holders on which a plurality of swabs S or a plurality of reagent tubes U may be mounted, without special devices or mechanical elements.

An opening/closing window (not shown) through which medical staff may access the test booth 10 is formed at the rear of the test booth 10, and a medical staff member or an assistant manually replenishes the swab S or the reagent tube U to the swab mount holder 101 and the input tube mount holder 102 and takes out the reagent tube U from the output tube mount holder 103.

However, the present disclosure is not limited thereto, and the swab S or the reagent tube U may be automatically replenished or taken out, by using a conveyor device or the like.

As described above, in the present embodiment, a process of replenishing or taking out the swab S or the reagent tube U to or from the swab mount holder 101, the input tube mount holder 102, and the output tube mount holder 103 is not included in the specimen collection process.

On the work surface 110 of the rack 14, a tube processing device 105 for performing preparation by, for example, opening a lid of the reagent tube U, a disinfection device 104 for ultraviolet sterilizing/disinfecting the swab S, and a trash box 106 for discarding a handle portion of the swab S remaining after a head portion is cut are further arranged. The tube processing device 105, the disinfection device 104, and the trash box 106 are all located in front of the robot 20 (close to the subject P) with respect to the beam 13.

According to the present embodiment, when the reagent tube U is mounted on the mount holder, the tube processing device 105 performs a function of opening the lid of the reagent tube U by using a rotating cap separation device or closing the lid by reverse rotation. In addition, the tube processing device 105 includes a cutter configured to, when a head portion of the swab S, using which specimen collection by the robot 20 is completed, is inserted into the reagent tube U placed on the tube processing device 105, cut a handle portion of the swab S extending to the outside of the reagent tube U.

Figure 14:
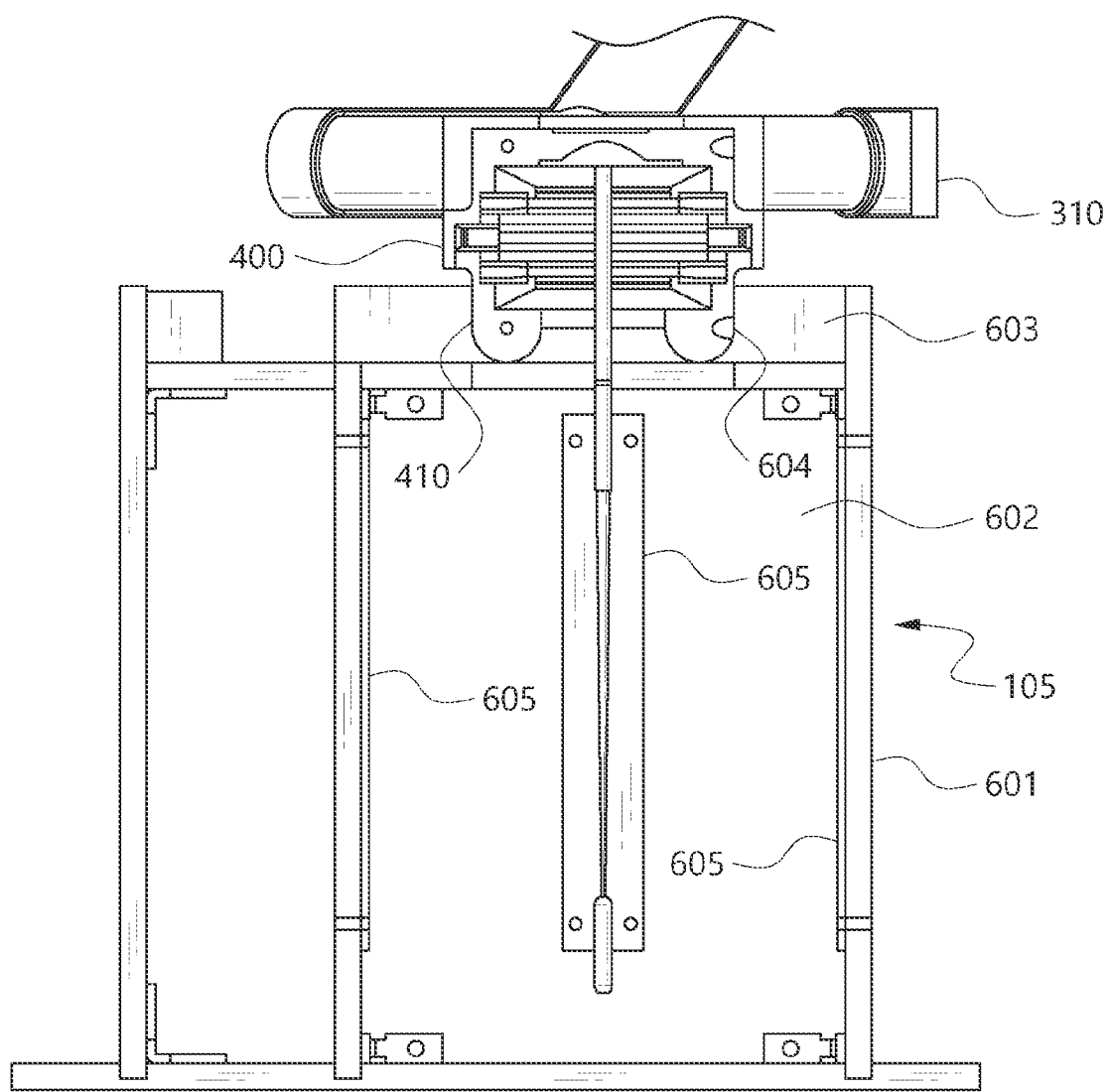
FIG. 14 is a view illustrating a configuration of a disinfection device according to an embodiment.

The disinfection device 104 is a device capable of performing ultraviolet (UV) sterilization/disinfection using a light-emitting diode (LED) lamp (see FIG. 14). The trash box 106 is a member for collecting the cut handle portion of the swab S, and a configuration of the trash box 106 is not particularly limited.

As such, according to the present embodiment, because the robot 20 is installed in the air, a space required to install the robot 20 may be saved, and accordingly, various elements required to perform a process may be compactly arranged. Accordingly, space utilization may be maximized, and a movement path of the robot may be optimized.

Figure 4:
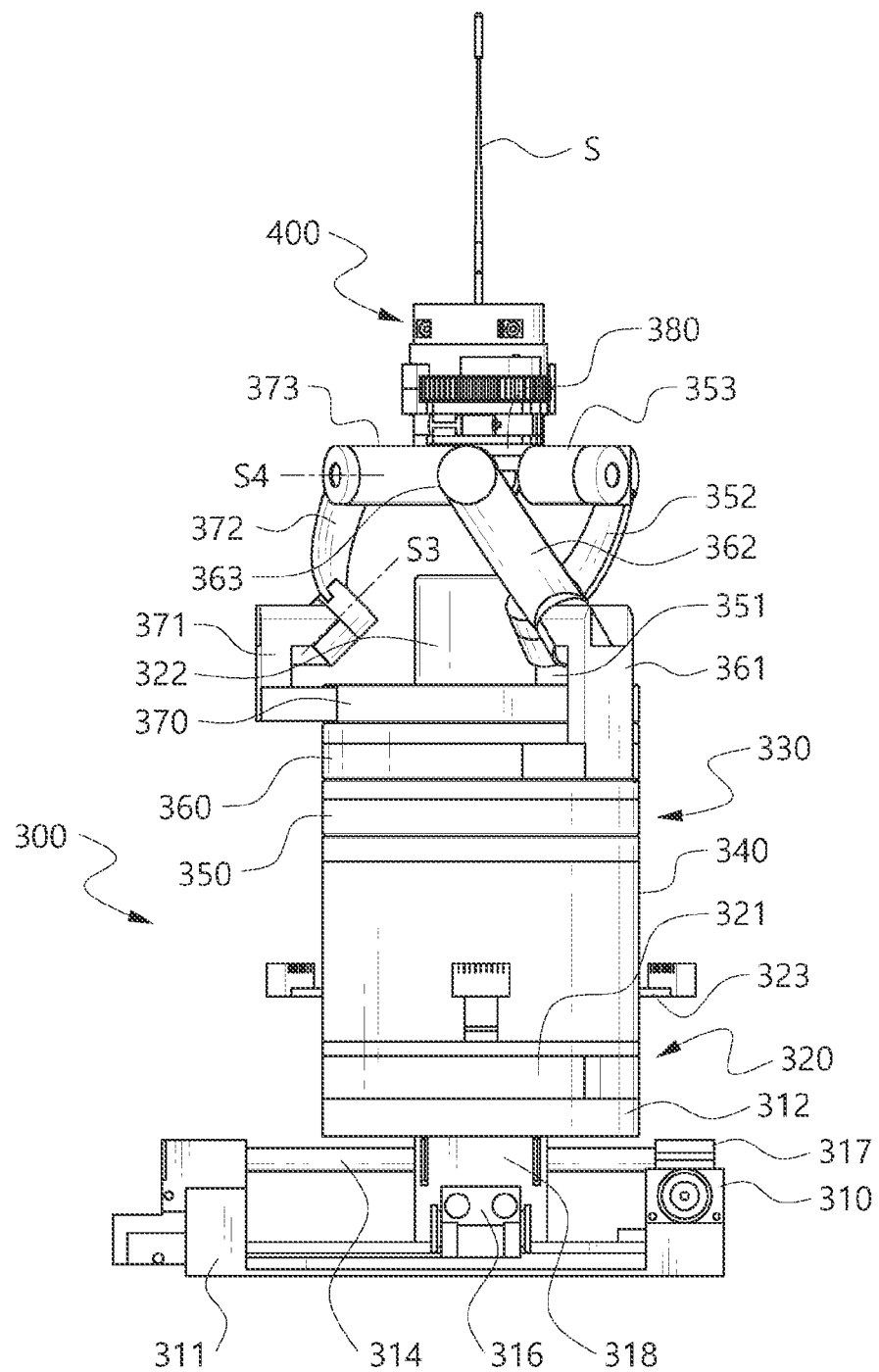
FIG. 4 is a view illustrating an initial state of an end effector according to an embodiment.

FIG. 4 is a view illustrating a configuration of the end effector 300 according to an embodiment.

Referring to FIG. 4, the end effector 300 includes a posture changing module 330 to which the gripper 400 is connected, a rotation module 340 connected to the posture changing module 330 to rotate the posture changing module 330, an insertion module 320 connected to the rotation module 340 to move the rotation module 340 in a front-back direction, and a translation module 310 connected to the insertion module 320 to move the insertion module 320 in a front-back-left-right direction in a plane perpendicular to the front-back direction.

In the front-back direction, the front direction is a direction in which a head of the swab S faces in an initial state where a longitudinal central axis of the end effector 300 and an extending direction of the swab S are substantially the same, and the back direction is the opposite direction.

Also, in the front-back-left-right direction, the front direction is a direction toward the paper sheet of FIG. 4, and the back direction is the opposite direction. The left direction is a left direction in FIG. 4, and the right direction is the opposite direction. However, the front-back-left-right direction is not limited thereto, and may refer to any four directions that are perpendicular to one another in a plane perpendicular to the front-back direction (i.e., plane perpendicular to the paper sheet of FIG. 4).

Figure 5:
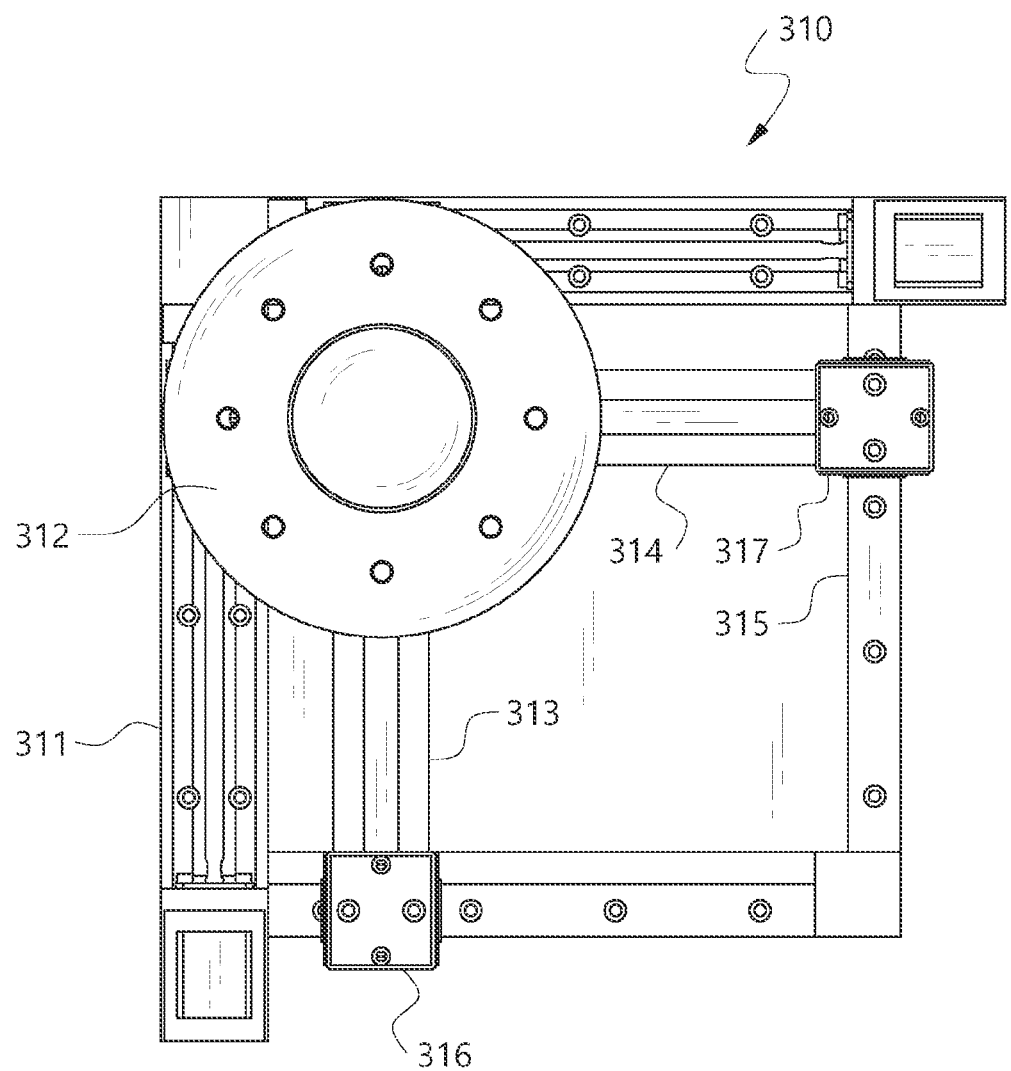
FIG. 5 is a view illustrating a translation module of the end effector of FIG. 4.

FIG. 5 is a view illustrating the translation module 310 of the end effector 300. FIG. 5 and other drawings illustrate only a basic configuration of the translation module 310, and the inside of the translation module 310 may be covered by a cover (not shown).

As shown in FIG. 5, the translation module 310 includes a rail frame 311 having a substantially "]" shape, and a guide frame 315 having a substantially "[" shape. The rail frame 311 and the guide frame 315 form a frame structure having a substantially quadrangular shape.

In the frame structure having the quadrangular shape, a vertical guide 313 that connects the rail frame 311 on one side to the guide frame 315 on one side, and a horizontal guide 314 that connects the rail frame 311 on the other side to the guide frame 315 on the other side are provided. As shown in FIG. 5, the vertical guide 313 and the horizontal guide 314 are provided to have different heights.

An end portion 316 of the vertical guide 313 is provided to be movable along the rail frame 311 and the guide frame 315 connected to the end portion 316 of the vertical guide 313. An end portion 317 of the horizontal guide 314 is provided to be movable along the rail frame 311 and the guide frame 315 connected to the end portion 317 of the horizontal guide 314.

The translation module 310 includes a connection member 312 having a circular plate shape to which the insertion module 320 is fixed, and a moving member 318 coupled to the horizontal guide 314 and the vertical guide 313 at a lower end of the connection member 312.

As the entire vertical guide 313 moves in a left-right direction along a frame connected to the vertical guide 313, the moving member 318 and the connection member 312 move in the left-right direction. Accordingly, the insertion module 320 connected to the connection member 312 moves in the left-right direction.

Also, as the entire horizontal guide 314 moves in the front-back direction along a frame connected to the horizontal guide 314, the moving member 318 and the connection member 312 move in the front-back direction. Accordingly, the insertion module 320 connected to the connection member 312 moves in the front-back direction.

The moving member 318 is moved by a driving device such as a motor or a hydraulic actuator (not shown).

Referring back to FIG. 4, the insertion module 320 includes a connection member 321 having a circular plate shape connected to the connection member 312 of the translation module 310, a shaft member 322 vertically extending from the center of the connection member 312, and a moving member 323 linearly movable along the shaft member 322. The moving member 323 is driven by a driving device such as a motor or a hydraulic actuator (not shown) to move along the shaft member 322.

The rotation module 340 is fixed to the moving member 323. As the moving member 323 moves in the front-back direction along the shaft member 322, the rotation module 340 also moves in the front-back direction along the shaft member 322.

Figure 6:
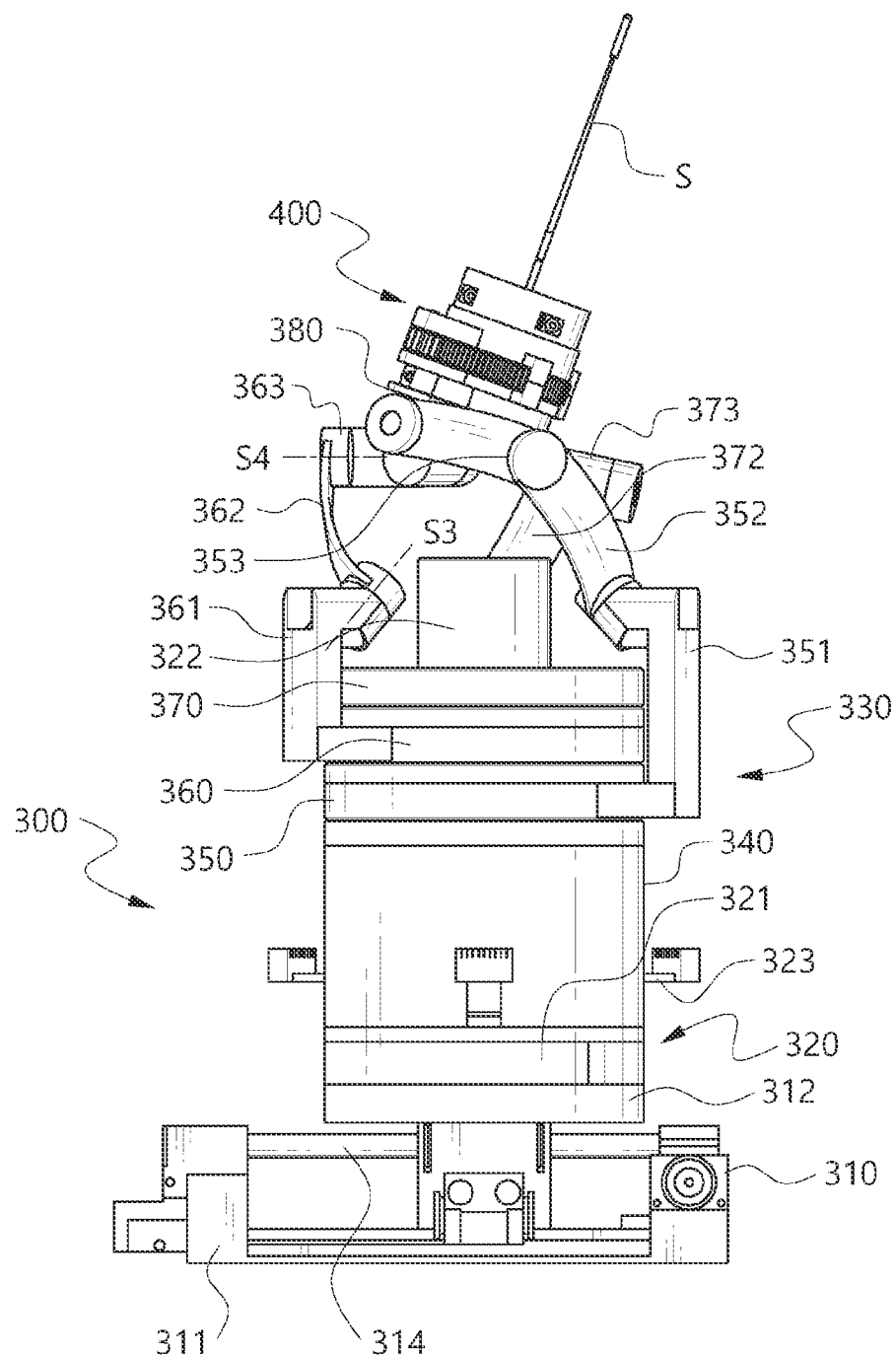
FIG. 6 is a view illustrating a state where a gripper is moved forward by using the end effector of FIG. 4.

FIG. 6 is a view illustrating a state where the moving member 323 moves forward. As shown in FIG. 6, when the rotation module 340 moves in the front-back direction due to the moving member 323, the posture changing module 330 connected to the front of the rotation module 340 also moves in the front-back direction. Accordingly, an object such as the gripper 400 coupled to the posture changing module 330 and the swab S gripped by the gripper 400 are movable in the front-back direction.

Referring back to FIG. 4, the posture changing module 330 has a spherical parallel mechanism in which a fixing portion 380 on which the gripper 400 is mounted is supported by three rotation links.

A first rotation link of the posture changing module 330 includes a rotating portion 370 having a ring shape surrounding the rotation module 340, a first link 371 extending forward from the rotating portion 370, a third link 373 extending outward in a radial direction of the fixing portion 380 from the fixing portion 380, and a second link 372 pivotably connected to each of the first link 371 and the third link 373. The second link 372 has an arc shape. An end portion of the second link 372 is pivotable about a third axis S3 with respect to the first link 371, and the other end portion of the second link 372 is pivotable about a fourth axis S4 with respect to the third link 373. The third axis S3 and the fourth axis S4 are arranged to have a certain acute angle therebetween.

A first gear (not shown) is rotatably formed on the rotation module 340, and a gear is formed on an inner surface of the rotating portion 370 and is engaged with the first gear. As the first gear rotates, the rotating portion 370 rotates about a central axis of the rotation module 340.

A second rotation link of the posture changing module 330 includes a rotating portion 360 having a ring shape, a first link 361 extending forward from the rotating portion 360, a third link 363 extending outward in a radial direction of the fixing portion 380 from the fixing portion 380, and a second link 362 pivotably connected to each of the first link 361 and the third link 363. A third rotation link of the posture changing module 300 includes a rotating portion 350 having a ring shape, a first link 351 extending forward from the rotating portion 350, a third link 353 extending outward in a radial direction of the fixing portion 380 from the fixing portion 380, and a second link 352 pivotably connected to each of the first link 351 and the third link 353.

A second gear (not shown) is rotatably formed on the rotation module 340, and a gear is formed on an inner surface of the rotating portion 360 of the second rotation link and is engaged with the second gear. As the second gear rotates, the rotating portion 360 rotates about the central axis of the rotation module 340. Also, a third gear (not shown) is rotatably formed on the rotation module 340. A gear is formed on an inner surface of the rotating portion 350 of the third rotation link and is engaged with the third gear. As the third gear rotates, the rotating portion 350 rotates about the central axis of the rotation module 340.

The first through third gears of the rotation module 340 are sequentially formed at the front of the rotation module 340. The rotation module 340 may independently rotate each of the first through third gears (independently adjust a speed and a direction). That is, the rotation module 340 may independently rotate each of the first rotation link through the third rotation link of the posture changing module 330.

The first rotation link through the third rotation link of the posture changing module 330 respectively correspond to positions of the first through third gears of the rotation module 340 and positions of the rotating portions are different in a longitudinal direction, but other elements are substantially the same.

A manipulator structure of the spherical parallel mechanism formed by the posture changing module 330 and the rotation module 340 is well known, and thus, a more detailed description thereof will be omitted.

An orientation angle (posture) of the gripper 400 may be changed, by controlling three link structures of the first rotation link through the third rotation link of the posture changing module 330.

Figure 7:
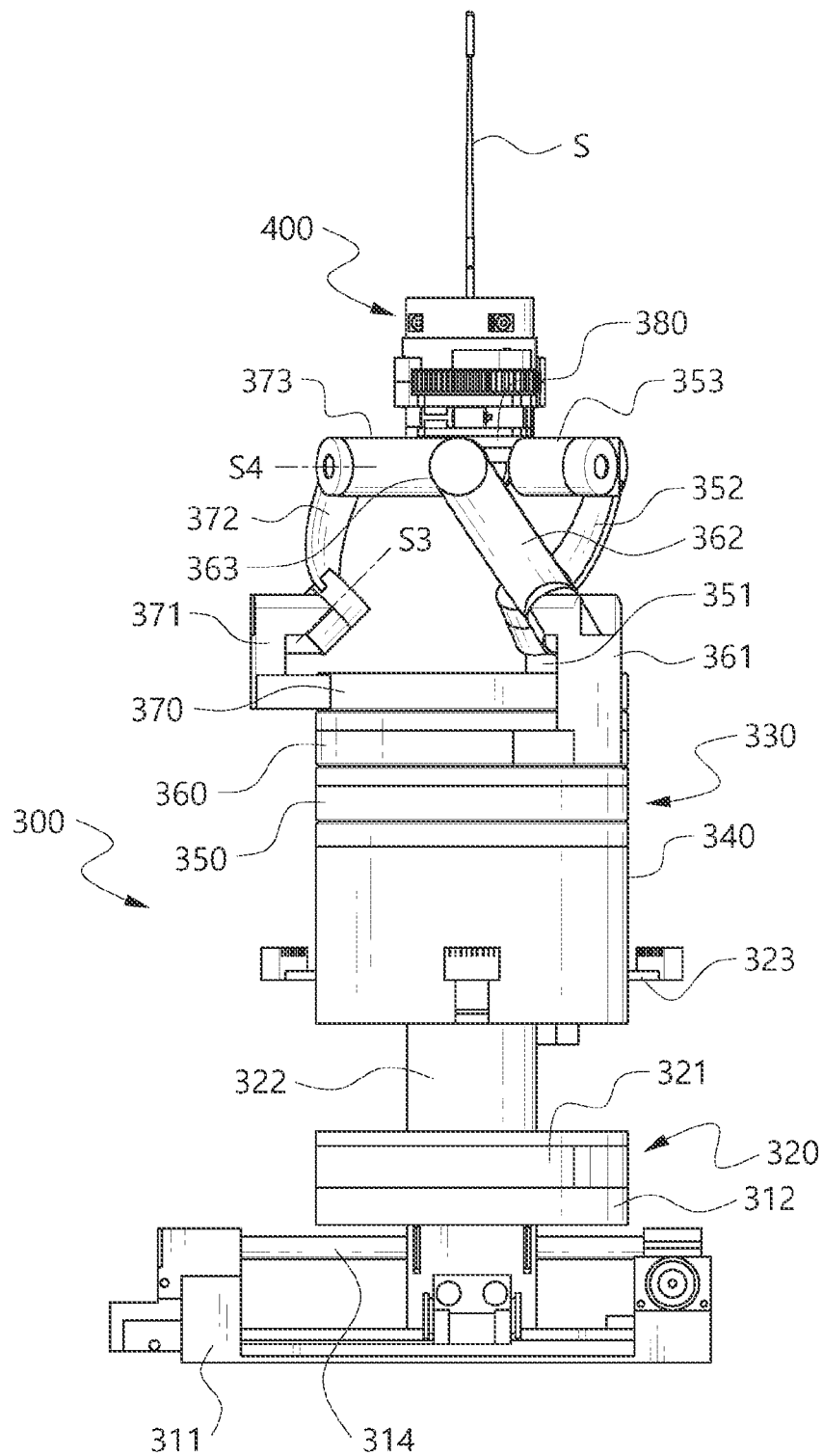
FIG. 7 is a view illustrating a state where a posture of a gripper is changed by using the end effector of FIG. 4.

FIG. 7 is a view illustrating a state where a posture of the gripper 400 is changed. For example, when the rotating portion 360 of the second rotation link and the rotating portion 370 of the third rotation link are rotated in opposite directions by using the rotation module 340, the gripper 400 is obliquely steered in one direction.

It will be understood that a direction of the gripper 400 may be any of all directions by independently rotating the first rotation link through the third rotation link to cause complex steering.

When the first rotation link through the third rotation link of the posture changing module 330 are rotated in the same direction and at the same speed by using the rotation module 340, the gripper 400 rotates about a longitudinal central axis of the gripper 400 in the posture.

That is, when the posture changing module 330 is rotated by using the rotation module 340 with no relative movement, the gripper 400 rotates. When a relative movement (operation) of the posture changing module 330 is caused by using the rotation module 340, an orientation angle of the gripper 400 may be changed.

In the present embodiment, the translation module 310, the insertion module 320, the rotation module 330, and the posture changing module 340 are sequentially connected in series. An operation of each module affects modules connected to the front thereof, and thus, finally, a front-back movement, a front-back-left-right movement, a posture change, and a rotation of the gripper 400 are caused. Accordingly, a configuration of the end effector 300 may be compact.

However, a configuration of the end effector 300 is not limited to the present embodiment as long as the end effector 300 includes a posture changing module for adjusting an orientation angle of the gripper 400, a rotation module for rotating the gripper 400, an insertion module for moving the gripper 400 in the front-back direction, and a translation module for moving the gripper 400 in the front-back-left-right direction in a plane perpendicular to the front-back direction.

Figure 8:
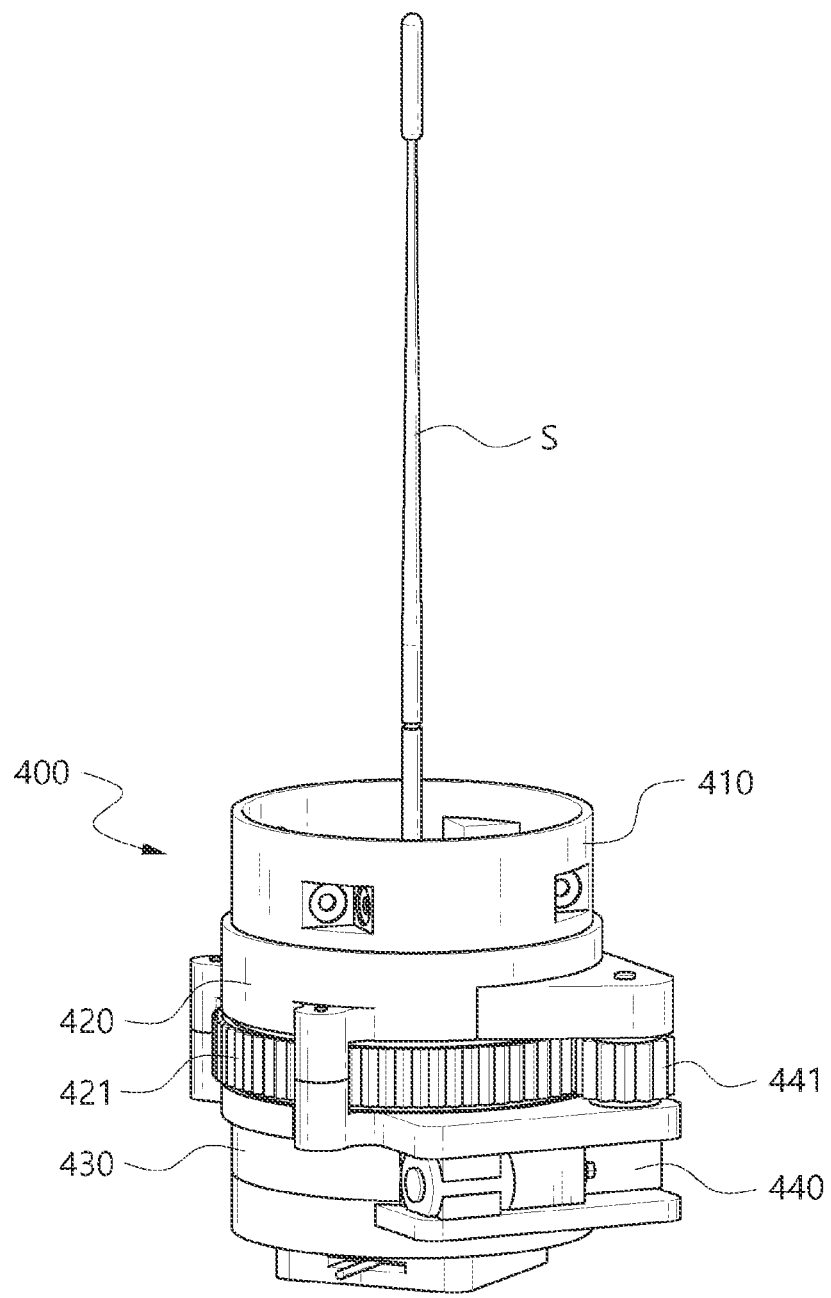
FIG. 8 is a view illustrating the gripper according to an embodiment.

FIG. 8 is a view illustrating the gripper 400 according to an embodiment.

As shown in FIG. 8, the gripper 400 includes a first drum 410, a second drum 420, and a third drum 430 which are coupled in series to constitute a drum-shaped body.

The first drum 410 has a hollow, and both end portions of the first drum 410 are open. The second drum 420 has a hollow, and both end portions of the second drum 420 are open. The third drum 430 has a hollow, and an end portion of the third drum 430 connected to the second drum 420 is open and the other end portion of the third drum 420 is closed.

The first drum 410 is connected to the second drum 420 so that the hollows therein communicate with each other, and the first drum 410 and the second drum 420 are relatively rotatable on a concentric axis.

The third drum 430 is connected to the second drum 420 on a side opposite to the first drum 410. The third drum 430 is connected to the second drum 420 so that the hollows therein communicate with each other, and the second drum 420 and the third drum 430 are relatively rotatable on a concentric axis.

According to the present embodiment, because the first drum 410 and the third drum 430 are fixed and the second drum 420 rotates, a relative rotation between the first drum 410 and the second drum 420 and a relative rotation between the third drum 430 and the second drum 420 occur.

As shown in FIG. 8, gear teeth 421 are formed on an outer surface of the second drum 420, and when a gear 441 engaged with the gear teeth 421 is rotated by a motor 440, the second drum 420 is rotated.

The gripper 400 according to the present embodiment forms a gripping portion by using a band, which will be described with reference to FIGS. 9A through 10.

FIGS. 9A through 9D are schematic views for describing an internal structure and an operation of the gripper 400. FIG. 10 is a view for describing an internal structure of the gripper 400. In FIGS. 9A through 9D, for explanation, the first drum 410 through the third drum 430 of the gripper 400 are schematically illustrated to have circular plate shapes and be spaced apart from one another.

As shown in FIGS. 9A through 9D, the gripper 400 includes a plurality of bands 451 extending in a longitudinal direction of the gripper 400 to span all of the first drum 410, the second drum 420, and the third drum 430. Four bands 451 are formed in the present embodiment.

Each of the plurality of bands 451 has one end fixed to the first drum 410, passes through the second drum 420 (passes through a through-hole formed in the second drum 420), and has the other end fixed to the third drum 430.

Figure 9A:
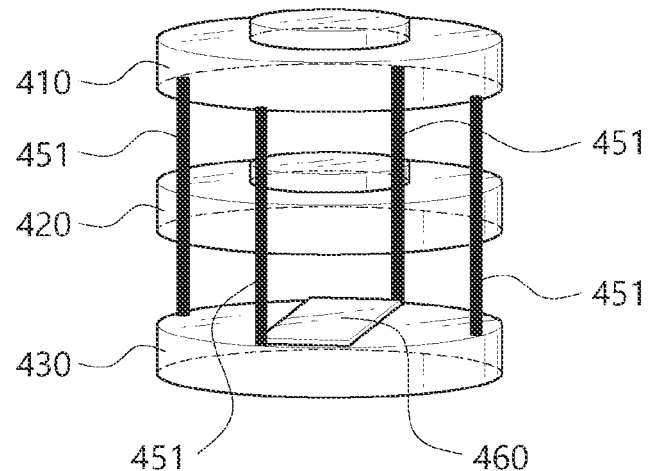
FIGS. 9A through 9D are schematic views for describing an internal structure and an operation of the gripper of FIG. 8.

As shown in FIG. 9A, in an initial state of the gripper 400, the plurality of bands 451 extend along a longitudinal central axis of the gripper 400 and are parallel to one another. The plurality of bands 451 are radially arranged around the longitudinal central axis of the gripper 400.

A sensor 460 for detecting a contact of an object entering the hollow is located at the closed end portion of the third drum 430.

Figure 9B:
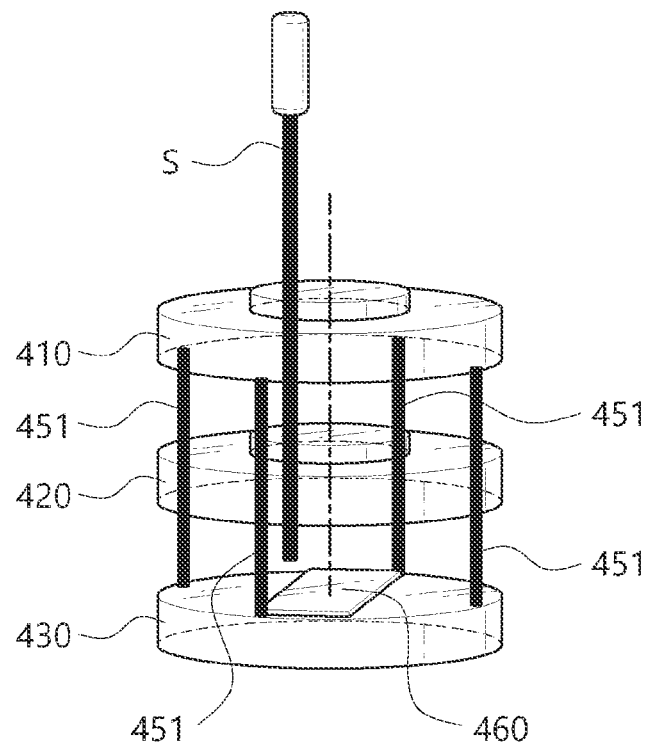
Figure 9C:
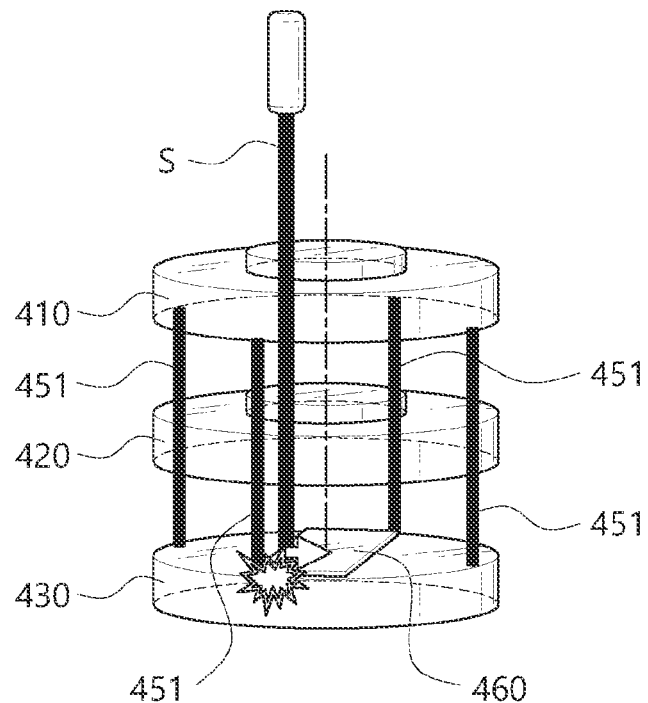

As shown in FIG. 9B, when the gripper 400 moves, a handle portion of the swab S passes through an inlet portion of the first drum 410 and enters the hollow. As shown in FIG. 9O, when the gripper 400 moves further, an end of the handle portion of the swab S contacts the sensor 460.

When an object such as the swab S contacts the sensor 460, the second drum 420 rotates in one direction. That is, the first drum 410 and the second drum 420 relatively rotate, and the second drum 420 and the third drum 430 relatively rotate.

Figure 9D:
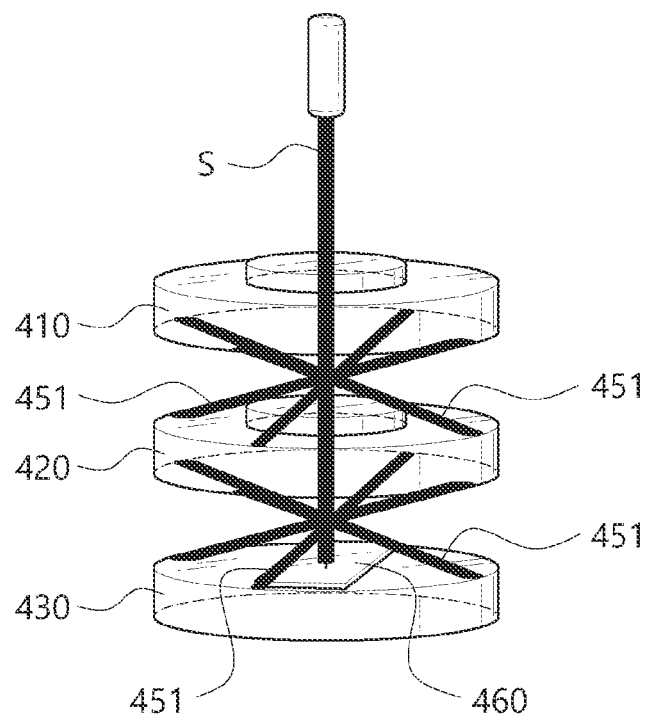

Both ends of the plurality of bands 451 are respectively fixed to the first drum 410 and the third drum 430. Accordingly, as shown in FIG. 9D, when the first drum 410 and the second drum 420 relatively rotate, fixed positions of the bands 451 on the second drum 420 also rotate, and fixed positions of the bands 451 on the first drum 410 do not rotate. Accordingly, the plurality of bands 451 are twisted between the first drum 410 and the second drum 4520, to form a twisted structure. Likewise, when the second drum 420 and the third drum 430 relatively rotate, the plurality of bands 451 are twisted between the second drum 420 and the third drum 430, to form a twisted structure. That is, a two-stage band twisted structure is formed around the second drum.

Figure 10:
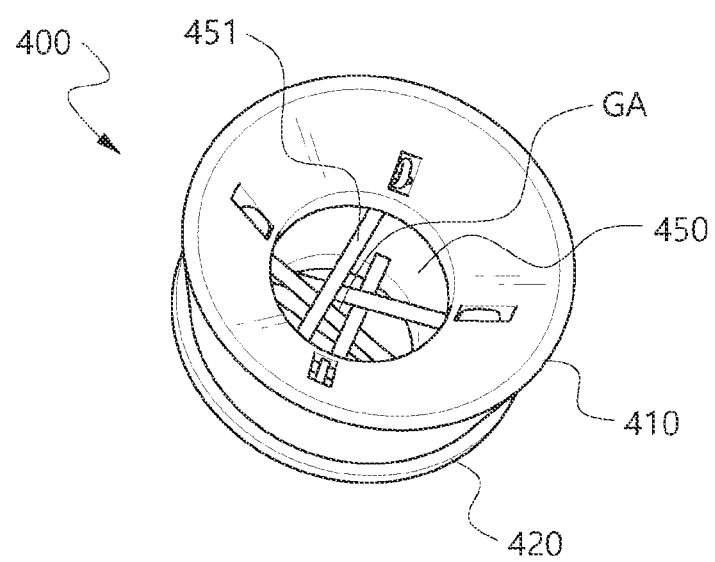
FIG. 10 is a view for describing an internal structure of the gripper of FIG. 8.

As shown in FIG. 10, the plurality of bands 451 are radially arranged at the same distance around the longitudinal central axis of the gripper 400. Accordingly, a gripping portion GA surrounded by the bands 451 twisted around the longitudinal central axis is formed in the hollow of the gripper 400.

As the second drum 420 rotates, the area of the gripping portion GA is gradually reduced, and thus, the plurality of bands 451 drive the swab S located therebetween toward the longitudinal central axis of the gripper 400. In this case, because the plurality of bands 451 completely surround the swab S, for example, a case where an object is caught between jaws while being driven toward the center by using the jaws as in a gripper tightened toward the center by using three jaws does not occur.

As shown in FIG. 9D, when all of the twisted plurality of bands 451 contact the object entering the hollow, the gripping portion GA tightens and fixes the object (swab S). According to the present embodiments, because the plurality of bands 451 are formed in a flat shape whose thickness is greater than a width, a contact force when the bands 451 contact a gripped object is increased.

As described above, the gripping portion GA formed by the twisted plurality of bands 451 tends to be aligned with the longitudinal central axis in the hollow of the gripper 400. Accordingly, according to the present embodiment, a position of the swab S which is eccentric with respect to the longitudinal central axis of the gripper 400 is automatically aligned with the longitudinal central axis of the gripper 400 by the bands 451.

When the second drum 420 is rotated in the opposite direction to the above, the twisted bands 451 are untwisted to initial states as shown in FIG. 9A, to release gripping.

Also, the gripper 400 according to the present embodiment has a two-stage band twisted structure, and the gripping portion GA is formed at a central portion of each-stage twisted structure. Accordingly, the swab S gripped by the gripping portion GA is aligned with the longitudinal direction of the gripper 400, without being inclined with respect to the longitudinal direction of the gripper 400.

According to this configuration, when the swab S is gripped by using the gripper 400, the swab S does not need to be separately aligned with respect to the gripper 400.

According to the present embodiment, the plurality of bands 451 are each formed of an elastic material (e.g., rubber), and are in a tight state in the initial states shown in FIG. 9A.

That is, as shown in FIG. 9D, in a state where a twisted structure is formed, the plurality of bands 451 are pulled to increase their lengths.

According to this configuration, a size of the gripping portion GA may be adjusted by adjusting a degree of rotation of the second drum 420. When the second drum 420 is rotated more with respect to another drum, a size of a space of the gripping portion GA becomes smaller, and when the second drum 420 is rotated less with respect to another drum, a size of a space of the gripping portion GA becomes larger.

Accordingly, any object having a long shape and entering the hollow of the gripper 400 may be gripped regardless of a diameter of the object, by appropriately adjusting a rotation angle of the second drum 420 of the gripper 400.

As such, the gripper 400 according to the present embodiment may grip objects with different diameters, by using the same gripping portion GA. Accordingly, the robot 20 according to the present embodiment may grip objects with different diameters, without replacing the gripper 400. A process of 'replacing' the gripper involves a process of performing a (subsequent) operation with a robot arm including another gripper, a process of replacing a gripper mounted on one robot arm with another gripper, and a process of transforming a gripping portion of one gripper. A process of 'transforming' involves a process of replacing a gripping portion in one gripper or a process of changing a shape of a gripping portion. As in the present embodiment, a process of performing the same operation but changing a gripped object by changing a degree is not included in the process of 'transforming'.

By using the gripper 400, the robot system 1 according to the present embodiment selectively grips the swab S and the reagent tube U with one gripper 400 without replacing the gripper 400, and performs a specimen collection process.

Figure 11:
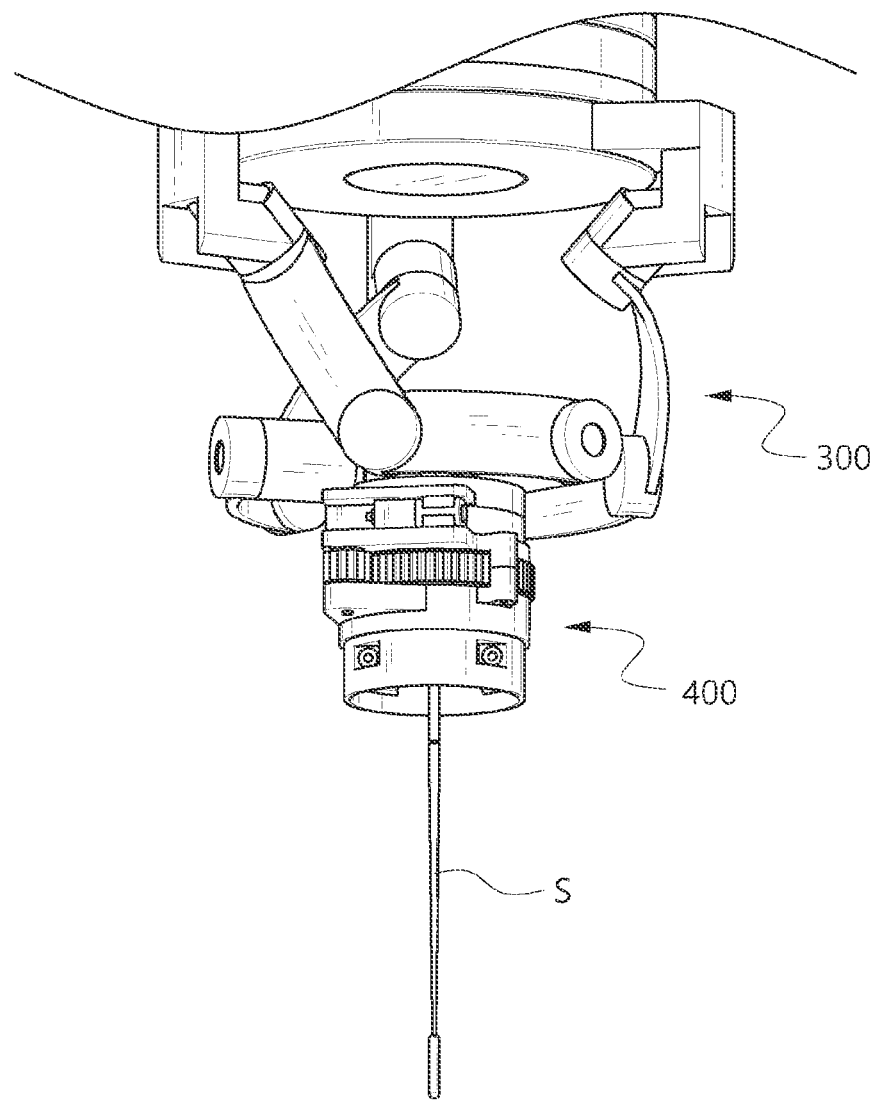
FIG. 11 is a view illustrating a state where a swab is gripped by the gripper of FIG. 8.
Figure 12:
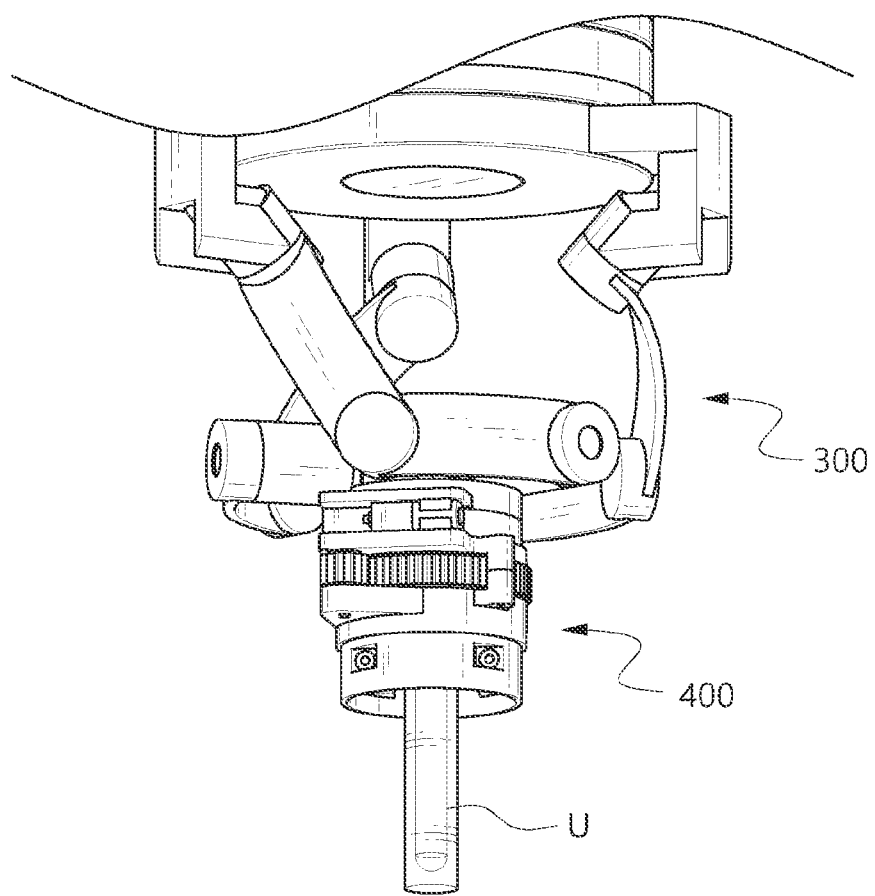
FIG. 12 is a view illustrating a state where a reagent tube is gripped by the gripper of FIG. 8.

FIG. 11 is a view illustrating a state where the swab S is gripped by the gripper 400. FIG. 12 is a view illustrating a state where the reagent tube U is gripped by the gripper 400.

According to the present embodiment, a rotation angle of the second drum 420 (i.e., a relative rotation angle between the first drum 410 and the second drum 420 and a relative rotation angle between the second drum 420 and the third drum 430) is pre-determined according to diameters of the swab S and the reagent tube U that are gripped objects.

As described below, during a specimen collection process according to the present embodiment, because the swab S and the reagent tube U are substantially alternately gripped, it may be known at what point the swab S or the reagent tube U is gripped in the process.

Accordingly, a rotation angle of the second drum 420 with respect to the swab S and a rotation angle of the second drum 420 with respect to the reagent tube U may be pre-set, and the second drum 420 may be rotated by the determined rotation angle at an appropriate timing, to selectively grip the swab S or the reagent tube U.

According to the present embodiment, a rotation angle of the second drum 420 is set so that the second drum 420 is rotated a little more even after the bands 451 contact an object to be gripped, to reliably grip the object.

Although the first drum 410 and the third drum 430 are fixed and the second drum 420 rotates in the end effector 400 according to the present embodiment, the present disclosure is not limited thereto. For example, the second drum 420 may be fixed, and the first drum 410 and the third drum 430 may rotate. Also, each of the first drum 410, the second drum 420, and the third drum 430 may independently rotate.

Also, although one strand of band 451 extends from the first drum 410 through the second drum 420 to be fixed to the third drum 430 in the present embodiment, the present disclosure is not limited thereto. For example, a plurality of first bands may be fixed to span the first drum 410 and the second drum 420, and a plurality of second bands may be fixed to span the second drum 420 and the third drum 430.

However, when one strand of band 451 extends from the first drum 410 through the second drum 420 to be fixed to the third drum 430, the first drum 410 and the third drum 430 are fixed, and the second drum 420 rotates as in the present embodiment, the number of motors may be reduced and an operation of the gripper 400 may be uniformly controlled.

Also, although the gripper 400 includes a triple structure of the first drum 410, the second drum 420, and the third drum 430 to form a two-stage band twisted structure in the present embodiment, the present disclosure is not limited thereto. When necessary, the gripper 400 may include a quadruple structure, or may include a dual structure of the first drum 410 and the second drum 420. In the latter dual structure, an element into which an end portion of a gripped object may be inserted or fixed may be provided.

A specimen collection process performed by the robot system 1 will now be described with reference to FIG. 13.

Figure 13:
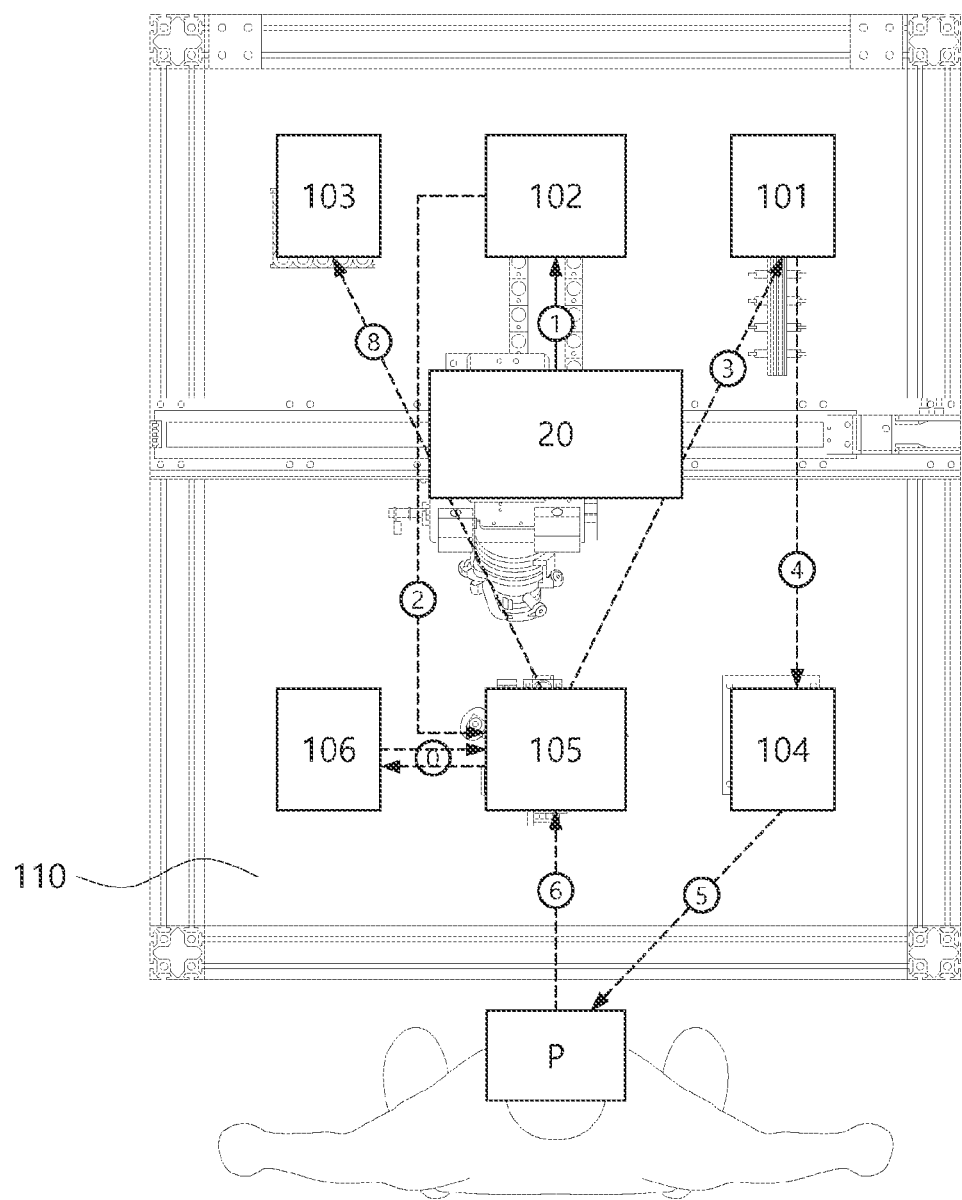
FIG. 13 is a view for describing an order in which a specimen collection process is performed by the robot system of FIG. 1.

FIG. 13 is a view for describing an order in which a specimen collection process is performed by the robot system 1.

First, a medical staff member mounts 20 swabs S and 20 reagent tubes U on the swab mount holder 101 and the input tube mount holder 102.

The robot 20 drives the robot arm 200 to move the gripper 400 over the input tube mount holder 102. The robot 20 grips one of the reagent tubes U mounted on the input tube mount holder 102 by using the gripper 400. The movement of the gripper 400 to an accurate griping position on the input tube mount holder 102 is made by appropriately operating the robot arm 200 and the end effector 300. The same goes even when the swab S and the reagent tube U are gripped and transferred.

Next, the robot 20 drives the robot arm 200 to move the gripper 400 over the tube processing device 105, and places the gripped reagent tube U on a mount holder of the tube processing device 105.

Next, the robot 20 drives the robot arm 200 to move the gripper 400 over the swab mount holder 101. While the robot arm 200 moves, the tube processing device 105 opens a lid of the reagent tube U mounted on the tube processing device 105. The robot 20 moved to the swab mount holder 101 grips one of the swabs S mounted on the swab mount holder 101 by using the gripper 400.

Next, the robot 20 drives the robot arm 200 to move the gripper 400 over the disinfection device 104, and inserts the swab S that is being gripped into the disinfection device 104.

FIG. 14 is a view illustrating a configuration of the disinfection device 104 according to an embodiment.

As shown in FIG. 14, the disinfection device 104 includes a body 601 having an inner space 602, and an upper plate 603 covering an upper portion of the body 601.

A plurality of LED lamp arrays 605 capable of generating UV are located in the body 601. The swab S gripped by the gripper 400 is located at substantially the center of the plurality of LED lamp arrays 605 in the inner space 602. The swab S may be disinfected by the UV before specimen collection, to prevent infection of a subject and a test error.

An inlet portion 604 through which the swab S may pass is formed at the center of the upper plate 603. As shown in FIG. 14, a shape and a size of the inlet portion 604 are a shape and a size that fit a body (first drum 410) of the gripper 400 when the swab S is completely pushed inward.

That is, the body of the gripper 400 blocks the inlet portion of the disinfection device 105 while disinfection is performed. Accordingly, disinfection efficiency for the swab S may be improved and elements such as bands in the hollow of the gripper 400 may be disinfected by the UV.

In actual use, the outside of the robot 20 is covered with a plastic over to prevent contamination, but it is difficult to prevent contamination of the hollow of the gripper 400 into which the swab S or the like is to be inserted. According to the present embodiment, such a difficulty may be compensated for through the disinfection device 105.

Referring back to FIG. 13, the robot 20 drives the robot arm 200 to move the disinfected swab to the vicinity of the subject P and perform specimen collection.

In detail, the robot 20 moves the swab S to the front of the face of the subject P by using the robot arm 200. In this case, the robot arm 200 is moved to a position of the face of the subject P through an optimal path planning algorithm in a three-dimensional (3D) space. In detail, the nose or mouth of the subject P is recognized based on a deep neural network (DNN), and an optimal collection path of the swab S is automatically adjusted according to a height (see FIGS. 3A and 3B) or a facial appearance of the subject P. In the robot system 1, a vision camera (not shown) for capturing an image of the subject P is installed at a certain position.

When the automatic adjustment of the optimal collection path is completed, the robot arm 200 is fixed at the position without operating.

At the national level, there are cases where it is stipulated that medical staff should insert the swab S into a living body. Accordingly, according to the present embodiment, a process of operating the end effector 300 and inserting the swab S into a nasal cavity or an oral cavity to collect a specimen is performed by a medical staff member.

In more detail, a master device (not shown) capable of operating the end effector 300 as a slave robot is provided to the medical staff member, and a monitor (not shown) capable of visually checking the nasal cavity or the oral cavity of the subject P through the vision camera is provided to the medical staff member.

The master device intuitively enables all operations of the end effector 300, so that the gripper 400 moves in the front-back direction, moves in the front-back-left-right direction, and rotates.

While watching the monitor, the medical staff member drives the translation module 310 and the posture changing module 330 of the end effector 300 by using the master device, to have a posture in which the swab S may be inserted into the subject P. Next, the medical staff member drives the insertion module 320 to move the swab S forward to contact a specimen collection part. Next, the medical staff member rotates the posture changing module 330 through the rotation module 330 to rotate the swab S a certain number of times. The rotation of the swab S may be a 360° rotation, or may be a repletion of clockwise and counter-clockwise rotation at a certain angle.

When specimen collection is completed, the medical staff member moves the swab S backward by using the end effector 300 to take out the swab S from the nasal cavity or the oral cavity.

In the present embodiment, the swab S is automatically located in front of the face of the subject P by the robot arm 200, and then, the end effect 300 is operated by remote control of the medical staff member to perform specimen collection. However, when there are no restriction such as medical regulations, a process of operating the end effector 300 to perform specimen collection may also be automatically performed through a control algorithm using data, etc. of the vision camera.

Referring back to FIG. 13, when specimen collection is completed, the robot 20 drives the robot arm 200 to move the swab S to the tube processing device 105. Net, a head portion of the swab S is inserted into the reagent tube U whose lid is opened and that is placed on the tube processing device 105.

After the swab S is inserted by a certain depth, a handle portion of the swab S between the gripper 400 and the reagent tube U is cut off by using a cutter of the tube processing device 105.

Next, the robot 20 drives the robot arm 200 to move the gripper 400 to the trash box 106, release gripping of the gripper 400, and discard the handle portion into the trash box 106. In the meantime, the tube processing device 105 closes the lid of the reagent tube U.

Next, the robot 20 drives the robot arm 200 to move the gripper 400 back to the tube processing device 105. The gripper 400 grips the reagent tube U on the tube processing device 105. As described above, the robot 20 may directly grip the reagent tube U without replacing the gripper 400.

Next, when the robot 20 moves the gripped reagent tube U to the output tube mount holder 103, the specimen collection process is completed.

The reagent tube U on the output tube mount holder 103 after specimen collection is taken out by personnel such as medical staff, is labelled, and is transferred to a test site.

According to the present embodiment, the swab mount holder 101, the input tube mount holder 102, and the output tube mount holder 103 are located behind the beam 13 (far from the subject P) in the second direction (Y-axis direction) perpendicular to the first direction that is an extending direction of the beam 13, and the tube processing device 105 is located in front of the beam 13 in the second direction. Accordingly, during a specimen collection process, when the robot arm 200 repeatedly performs a swing around the beam 13 (along with a translation along the beam 13 of the robot 20), the specimen collection process is performed. Accordingly, because a specimen path for the specimen collection process is simplified, even with only one robot arm, a time to complete the specimen collection process may be shorter than that in the related art.

Accordingly, according to the robot system 1 according to the present embodiment, rapid specimen collection may be performed, space and cost may be greatly reduced, and space utilization and a specimen path may be optimized.

What is claimed is:

1. A specimen collection robot system for performing a specimen collection process comprising performing specimen collection of a subject with a swab having a first diameter and inserting the swab into a reagent tube having a second diameter, the specimen collection robot system comprising a robot comprising a gripper and a robot arm, and an end effector,
   wherein the gripper is configured to grip objects with different diameters by using a same gripping portion,
   wherein the robot is configured to perform the specimen collection process, by selectively gripping the swab and the reagent tube, without replacing the gripper,
   wherein the end effector is mounted on the robot arm and configured to change a posture and a position of the gripper,
   wherein the end effector comprises:
   a posture changer connected to the gripper and configured to adjust an orientation angle of the gripper,
   a rotator connected to the posture changer and configured to rotate the posture changer,
   an inserter connected to the rotator and configured to move the rotator in a front-back direction, and a translator connected to the inserter and configured to move the inserter in a front-back-left-right direction in a plane perpendicular to the front-back direction.

2. The specimen collection robot system according to claim 1, wherein the gripper comprises
a first drum comprising a hollow,
a second drum comprising a hollow and connected to the first drum, and
a plurality of bands fixed to span the first drum and the second drum, in the hollows of the first drum and the second drum,
wherein the first drum and the second drum are relatively rotatable,
wherein, due to the relative rotation of the first drum and the second drum, the plurality of bands are twisted with one another, to tighten and fix an object entering the hollows.

3. The specimen collection robot system according to claim 2, wherein the gripper comprises
a third drum comprising a hollow and connected to the second drum on a side opposite to the first drum, and
the plurality of bands fixed to span the second drum and the third drum, in the hollows of the second drum and the third drum,
wherein the second drum and the third drum are relatively rotatable,
wherein the first drum and the second drum relatively rotate and the second drum and the third drum relatively drum relatively rotate, to form a two-stage band twisted structure around the second drum.

4. The specimen collection robot system according to claim 3, wherein each of the plurality of bands is formed to span the first drum, the second drum, and the third drum,
wherein the second drum rotates with respect to the first drum and the third drum that are fixed.

5. The specimen collection robot system according to claim 3, wherein an end portion of the third drum is closed,
wherein a sensor for detecting a contact of an object entering the hollow is formed at the closed end portion of the third drum,
wherein when the contact of the object is detected by the sensor, the first drum and the second drum relatively rotate, and the second drum and the third drum relatively rotate.

6. The specimen collection robot system according to claim 3, wherein a relative rotation angle of the first drum and the second drum and a relative rotation angle of the second drum and the third drum are pre-determined according to the first diameter and the second diameter.

7. The specimen collection robot system according to claim 2, wherein each of the plurality of bands has a width greater than a thickness and is formed of an elastic material.

8. The specimen collection robot system according to claim 1, wherein the robot arm comprises
a first link pivotable with respect to a base, and
a second link pivotable with respect to the first link and allowing the end effector to be mounted thereon.

9. The specimen collection robot system according to claim 1, further comprising a test booth in which the robot is installed,
wherein the test booth comprises a rack, and a beam located over the rack and extending in a first direction,
wherein the robot arm comprises a base linearly moving along the beam, and a plurality of links connected in series to the base.

10. The specimen collection robot system according to claim 9, wherein,
a swab mount holder, an input tube mount holder, a tube processing device and an output tube mount holder are arranged on the rack,
wherein the swab mount holder is configured to hold the swab,
the input tube mount holder is configured to hold the reagent tube,
the tube processing device is configured to open a lid of the reagent tube, and
the output tube mount holder is configured to hold the reagent tube into which the swab used for specimen collection is inserted,
wherein, during the specimen collection process, the robot arm operates so that the gripper sequentially passes through the input tube mount holder, the tube processing device, the swab mount holder, the subject, back to the tube processing device, and the output tube mount holder.

11. The specimen collection robot system according to claim 10, wherein the swab mount holder, the input tube mount holder, and the output tube mount holder are located behind the beam in a second direction perpendicular to the first direction, and
the tube processing device is located in front of the beam in the second direction,
wherein, during the specimen collection process, the robot arm swings around the beam.

12. The specimen collection robot system according to claim 10, wherein,
a disinfection device for ultraviolet disinfecting the gripped swab on the swab mount holder is further arranged on the rack,
wherein a body of the gripper has a shape and a size enough to block an inlet portion of the disinfection device.

\* \* \* \* \*